US010487856B2

(12) United States Patent
Greeb et al.

(10) Patent No.: US 10,487,856 B2
(45) Date of Patent: Nov. 26, 2019

(54) HIGH-FLOW ELECTRO-HYDRAULIC ACTUATOR

(71) Applicants: Kevin E. Greeb, Fort Collins, CO (US); Philip A. LaFleur, Loveland, CO (US); Jonathan P. Workman, Loveland, CO (US); John J. Been, Fort Collins, CO (US)

(72) Inventors: Kevin E. Greeb, Fort Collins, CO (US); Philip A. LaFleur, Loveland, CO (US); Jonathan P. Workman, Loveland, CO (US); John J. Been, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 456 days.

(21) Appl. No.: 14/803,711

(22) Filed: Jul. 20, 2015

(65) Prior Publication Data

US 2015/0323085 A1    Nov. 12, 2015

Related U.S. Application Data

(63) Continuation of application No. 13/597,450, filed on Aug. 29, 2012, now Pat. No. 9,127,694.

(Continued)

(51) Int. Cl.
*F16K 11/076* (2006.01)
*F16K 27/04* (2006.01)
(Continued)

(52) U.S. Cl.
CPC ...... *F15B 13/0406* (2013.01); *F15B 13/0444* (2013.01); *F16K 11/076* (2013.01);
(Continued)

(58) Field of Classification Search
CPC .................................................................
F15B 13/0406; F15B 13/0444; F16K 11/076; F16K 31/041; F16K 27/041; F16K 27/00–48; Y10T 137/86863
See application file for complete search history.

(56) References Cited

U.S. PATENT DOCUMENTS 3,012,576 A    12/1961  Williams
3,756,282 A     9/1973  Knutson
(Continued)

FOREIGN PATENT DOCUMENTS

DE    19836042    2/2000
DE    10240852    3/2004
(Continued)

OTHER PUBLICATIONS

Parker Servovalves; date last visited Oct. 11, 2012; 2 pages printed from internet; http://www.parker.com/portal/site/PARKER/menuitem.7100150cebe5bbc2d6806710237ad1ca/?vgnextoid<f5c9b5bbec622110VgnVCM10000032a71dacRCRD&vgnextfmt<DE&vgnextdiv<&vgnextcatid<1537927&vgnextcat<SERVOVALES.
(Continued)

*Primary Examiner* — Eric Keasel
*Assistant Examiner* — Kevin Barss
(74) *Attorney, Agent, or Firm* — Reinhart Boerner Van Deuren P.C.

(57) ABSTRACT

Embodiments of the invention provide a high-reliability, cost-effective electro-hydraulic servo-valve assembly that is not susceptible to failure caused by contaminated fluid. In particular embodiments, the electro-hydraulic servo-valve assembly includes a rotary valve that may be actuated by either a direct-coupled Limited Angle Torque (LAT) motor, a geared, brushless DC motor, or some other rotary electric actuating element with an integrated driver circuit. In particular embodiments, the rotary valve element made up of an (Continued)

outer sleeve element and an inner spool element, with matching ports and slots, respectively.

13 Claims, 7 Drawing Sheets

Related U.S. Application Data

(60) Provisional application No. 61/532,922, filed on Sep. 9, 2011.

(51) Int. Cl.
*F16K 31/04* (2006.01)
*F15B 13/04* (2006.01)
*F15B 13/044* (2006.01)

(52) U.S. Cl.
CPC .......... *F16K 27/041* (2013.01); *F16K 27/048* (2013.01); *F16K 31/041* (2013.01); *Y10T 137/86863* (2015.04)

(56) References Cited

U.S. PATENT DOCUMENTS

| | | | |
|---|---|---|---|
| 4,155,535 A | 5/1979 | Seamone | |
| 4,177,834 A | 12/1979 | Bonney | |
| 4,199,007 A | 4/1980 | Holmes | |
| 4,201,005 A | 5/1980 | Hunt | |
| 4,658,859 A | 4/1987 | Backe et al. | |
| 4,800,924 A | 1/1989 | Johnson | |
| 4,858,650 A | 8/1989 | Devaud et al. | |
| 4,977,816 A | 12/1990 | Kuttruf | |
| 5,014,748 A | 5/1991 | Nogami et al. | |
| 5,150,737 A * | 9/1992 | Clerc | F16K 3/08 137/625.3 |
| 5,273,072 A * | 12/1993 | Phillips | B62D 5/083 137/625.23 |
| 5,467,800 A | 11/1995 | Sallas | |
| 5,522,419 A | 6/1996 | Sand | |
| 5,597,014 A | 1/1997 | Vick | |
| 5,839,463 A | 11/1998 | Blackmon et al. | |
| 5,868,165 A | 2/1999 | Tranovich | |
| 5,954,093 A | 9/1999 | Leonard | |
| 6,826,998 B2 | 12/2004 | Pinot | |
| 7,322,375 B2 | 1/2008 | Goldfarb et al. | |
| 2006/0067835 A1 | 3/2006 | Duwel et al. | |
| 2007/0297907 A1 | 12/2007 | Giebmanns | |
| 2009/0194169 A1 | 8/2009 | Greeb | |
| 2010/0065585 A1 | 3/2010 | Romanin et al. | |
| 2012/0241010 A1 | 9/2012 | Greeb | |

FOREIGN PATENT DOCUMENTS

| | | |
|---|---|---|
| EP | 0 276 188 A2 | 7/1988 |
| GB | 962794 | 7/1964 |
| GB | 1244976 | 9/1971 |

OTHER PUBLICATIONS

Bosch Rexroth Hydraulic Servos; date last visited Oct. 11, 2012; 1 page printed from internet; http://www.boschrexroth.com/country_units/america/united_states/sub_websites/brus_brh_i/en/products_ss/08_proportional_servo_valves/06_servo_valves/index.jsp.

Woodward Direct Drive Servovalves; date last visited Oct. 9, 2012; 1 page printed from internet; http://www.woodward.com/DirectDriveServovalves.aspx.

Woodward Electro-Hydraulic Servovalves; dated last visited Oct. 9, 2012; 1 page printed from internet; http://www.woodward.com/servovalves.aspx.

MOOG Electrohydraulic Valves . . . A Technical Look; date last visited Oct. 9, 2012; 24 pages printed from internet; http://www.moog.com/literature/ICD/Valves-Introduction.pdf.

\* cited by examiner

HIGH-FLOW ELECTRO-HYDRAULIC ACTUATOR

CROSS-REFERENCE TO RELATED PATENT APPLICATIONS

This patent application is a continuation of co-pending U.S. patent application Ser. No. 13/597,450, filed Aug. 29, 2012, which is now pending, and which claims the benefit of U.S. Provisional Patent Application No. 61/532,922, filed Sep. 9, 2011, the entire teachings and disclosure of which are incorporated herein by reference thereto.

FIELD OF THE INVENTION

This invention generally relates to electro-hydraulic actuators or servo-valves.

BACKGROUND OF THE INVENTION

Electro-hydraulic servo-valves are widely used to control the flow of hydraulic fluid into and out of power cylinders that are used to control, for example, the flow or pressure of fuel, air, or steam. However, some conventional servo-valves do not operate very efficiently or can fail when regulating the flow of contaminated fluids. Further, traditional servo-valves can be adversely affected by vibration. Vibration in the axial direction of the spool can move it from the desired position causing a position error of the actuator. Additionally, conventional servo-valves are typically non-compliant with Div. 1/Zone 1 hazardous location (explosion-proof) requirements. Typically, explosion-proof servo-valves are considered "specials" and are usually expensive devices requiring long lead times.

Further, many conventional servo-valves are two stage using a linear spool type flow control valve as the main fluid flow control element. Generally, tight radial clearances are used to help keep the sliding spool centered within the outer element and reduce fluid leakage. It is possible that these tight clearances can become further constricted if there is contamination in the fluid flow causing the spool to stick, for if the fluid is not filtered to extreme cleanliness levels. The need to maintain tight tolerances leads to time-consuming manufacturing processes and testing of the device, and drives up the cost of traditional servo-valves.

Also, in some cases, contamination in the fluid flow may restrict flow through nozzles in the first stage of the servo-valve. In other cases, small diameter wire used for the torque motor winding is subject to strain failure and is another source of poor reliability. Some conventional servo-valves require hydraulic pressure to move the spool valve to its failsafe position. If the filter supplying the first stage element plugs, or pressure is lost for some other reason, there is a risk that the servo-valve will not easily move to the failsafe position.

In some cases, conventional direct drive or proportional valves (rotary or linear) often have a "wet" drive motor that can collect iron particles from the oil, which can eventually decrease the performance of the valve. Further, conventional direct drive or proportional valves (rotary or linear) that have high flow capacity have high flow forces acting on the moving element. This requires a high-force electrically powered first stage that can have high power requirements and/or be too slow for good dynamic control. Also, conventional direct drive or proportional valves often only have a single control signal input and a single power input. Failure of either input causes the servo-valve to no longer function.

Embodiments of the invention provide an improvement over the state of the art in electro-hydraulic actuators. These and other advantages of the invention, as well as additional inventive features, will be apparent from the description of the invention provided herein.

BRIEF SUMMARY OF THE INVENTION

In one aspect, embodiments of the invention provide a high-reliability, cost-effective servo-valve assembly that is not susceptible to failure caused by contaminated fluid. In particular embodiments, the rotary control valve may be actuated by a direct-coupled Limited Angle Torque (LAT) motor, a geared, brushless DC motor, or some other rotary electric actuating element with an integrated driver circuit.

Embodiments of the invention include a rotary control valve element made up of an outer sleeve element and an inner spool element, with matching ports and/or slots, respectively. An inner spool element is mated essentially concentrically to the outer sleeve element by anti-friction elements. In an embodiment of the invention, the anti-friction elements are deep-groove ball bearings. In particular embodiments, the valve flow control ports are arranged essentially radially and equally-spaced such that pressure loading on the spool is balanced so as to not side-load the spool one way or the other.

For example, if the rotary control valve had two control ports, they would be arranged 180 degrees apart, if the valve had three control ports, they would be arranged 120 degrees apart, and so on. The valve could be configured in a two way, three-way, four-way, or other multi-functional valve configuration. In a particular embodiment, the four-way valve embodiment includes first and second control flow ports connected to the controlled element, which may be a hydraulic power cylinder. In either configuration, rotation in either direction from the null position (i.e., no flow out of any ports) will direct flow from the supply to the first control flow port and from the second control flow port to the drain, or from the supply to the second control flow port and from the first control flow port to the drain.

The position of the rotary control valve is controlled by the rotary electric actuating element, which is a LAT in certain embodiments of the invention. In certain embodiments, the rotary actuating element is controlled by the integrated driver circuit board, using an electronic rotary position sensor to monitor valve position. In particular embodiments, a return spring is attached to the inner valve element to provide a fail-safe rotation of the spool in the event of loss of signal to the rotary electric actuating element.

In another aspect, embodiments of the invention provide an electro-hydraulic actuator assembly that includes a housing, and a rotary control valve disposed within the housing, the rotary control valve having one or more control flow ports. In particular embodiments, the rotary control valve is actuated by one of a limited angle torque motor and a geared, brushless DC motor. In a further embodiment, the housing is compliant with Div. 1/Zone 1 hazardous location requirements.

In one embodiment, the invention provides an electro-hydraulic actuator assembly. The electro-hydraulic actuator assembly includes a housing with at least one port. A rotary control valve is disposed within the housing. The rotary control valve includes an outer sleeve with at least one port aligned with the at least one port of the housing. A spool is rotationally disposed within the sleeve. The spool includes a shaft and at least one valve element disposed along the shaft.

The at least one valve element includes at least one port formed thereon. A first and a second anti-friction element support opposing ends of the shaft of the spool. A rotary electric actuating device is coupled to an end of the shaft. The rotary electric actuating device is operable to rotate the spool to selectively align the at least one port of the spool with the at least one port of the sleeve.

In certain other subsidiary embodiments, the sleeve incorporates a radially-outwardly-directed spot face lead-in area adjacent to at least one port of the sleeve. At least one valve element includes a radially-inwardly-directed contoured spot face lead-in area adjacent to at least one port of at least one valve element.

In certain embodiments, the spool is a one piece construction machined from a single blank. In certain other embodiments, the spool is a multi-piece construction, with at least one valve element mechanically attached to the shaft of the spool. As a subsidiary feature of this embodiment, the shaft of the spool can include at least one pilot diameter on the shaft for receipt of a hub of at least one valve element. In certain embodiments, the rotary electric actuating device is one of a limited angle torque motor, a geared brushless DC motor, or a solenoid.

In certain embodiments, the actuator assembly additionally includes a return spring for biasing the spool to a failsafe position in the event of a failure in the rotary electric actuating device. The return spring can be coupled to an end of the shaft of the spool opposite the end of the shaft that is coupled to the rotary electric actuating device.

In a subsidiary embodiment, the first and second anti-friction elements are first and second bearings. The first bearing is axially disposed along the shaft of the spool interior of the return spring. The second bearing is axially disposed along the shaft of the spool interior of the rotary electric actuating device.

In another embodiment according to the invention, an electro-hydraulic actuator assembly is provided. The electro-hydraulic actuator assembly includes a housing. A rotary control valve is disposed within the housing. The rotary control valve includes an outer generally cylindrical sleeve having a bore therethrough. A spool is concentrically and rotationally disposed within the bore. The spool includes a shaft and at least one valve element disposed along the shaft. A first and a second anti-friction element are also provided wherein the first anti-friction element supports one end of the shaft while the second anti-friction element supports the other end of the shaft. The at least one valve element is interposed between the first and second anti-friction elements. The spool is held in a concentric clearance fit relationship relative to the sleeve by the first and second anti-friction elements. A rotary electric actuating device is coupled to an end of the shaft adjacent one of the first and second anti-friction elements. The rotary electric actuation device is operable to selectively rotate the spool. In a subsidiary embodiment, the valve/actuator housing is compliant with flameproof methods of protection suitable for Div. 1/Zone 1 hazardous locations.

In a subsidiary embodiment, the first and second anti-friction elements are deep-groove ball bearings. In another subsidiary embodiment, the housing is compliant with Div. 1/Zone 1 hazardous location requirements. In certain other subsidiary embodiments, the rotary electric actuating device is one of a limited angle torque motor, a geared brushless DC motor, or a solenoid.

In certain embodiments, the spool is a one-piece construction machined from a single blank. In certain other embodiments, the spool is a multi-piece construction, with the at least one valve element mechanically attached to the shaft.

In yet another embodiment according to the invention, an electro-hydraulic actuator assembly is provided. An electro-hydraulic actuator assembly according to this embodiment includes a housing. A rotary control valve is disposed within the housing. The rotary control valve includes an outer sleeve having a plurality of ports and defining a center line of the rotary control valve. A spool is concentrically and rotationally disposed within the sleeve along the center line thereof. The spool includes a plurality of ports. The plurality of ports of the sleeve and the plurality of ports of the spool are radially equally spaced such that pressure loading on the spool is balanced. A first and a second anti-friction element are also provided. The first and second anti-friction elements support opposing ends of the shaft. A rotary electric actuating device is also provided that is coupled to an end of the shaft adjacent one of the first and second anti-friction elements. The rotary electric actuation device is operable to selectively rotate the spool.

In a subsidiary embodiment, the valve/actuator housing is compliant with flameproof methods of protection suitable for Div. 1/Zone 1 hazardous locations. In a subsidiary embodiment, the first and second anti-friction elements are deep groove ball bearings. In yet another subsidiary embodiment, the rotary electric actuating device is one of a limited angle torque motor, a geared brushless DC motor, or a solenoid.

In certain embodiments, the spool is a one-piece construction machined from a single blank. In certain other embodiments, the spool is a multi-piece construction with the at least one valve element mechanically attached to the shaft.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
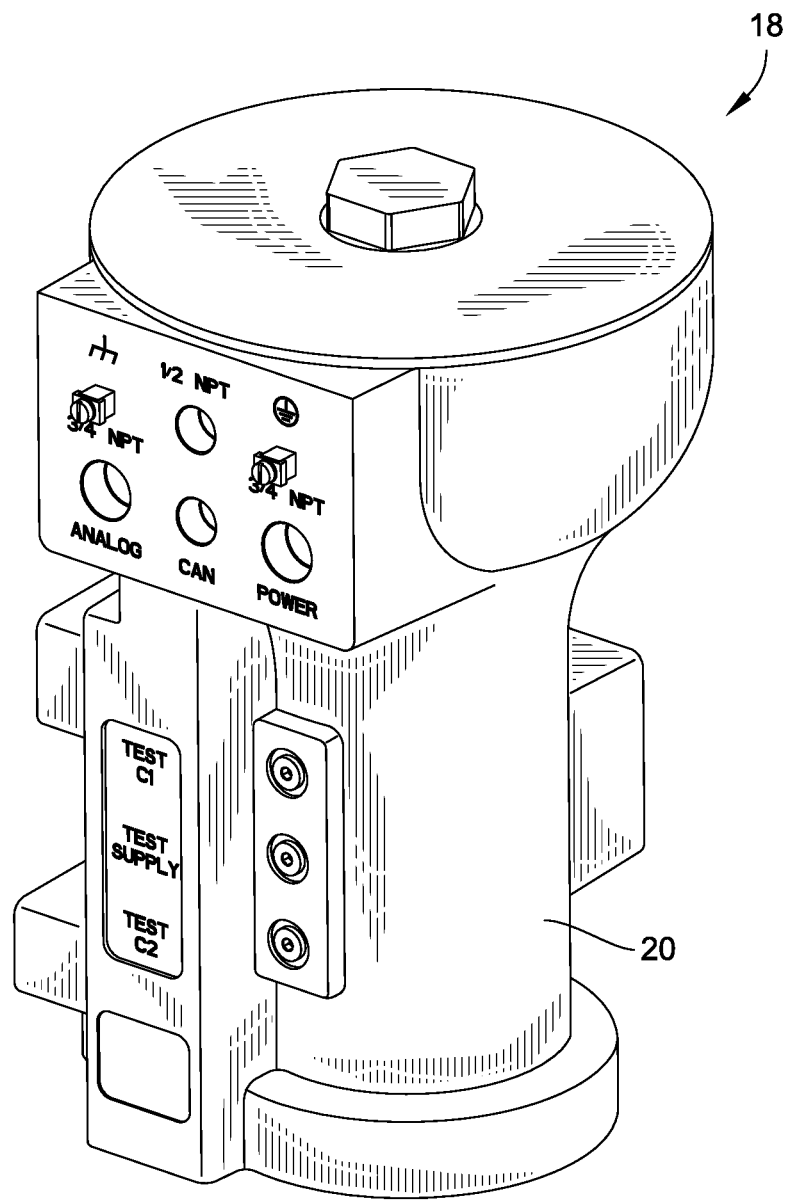
FIG. 1 is a perspective view of an electro-hydraulic actuator assembly, constructed in accordance with an embodiment of the invention.

FIG. 1 is a perspective view of a servo-valve assembly with integrated electrical actuator 18, constructed in accordance with an embodiment of the invention. The assembly includes a housing 20 with a rotary control valve 22 (See FIG. 2) positioned therein and operable to selectively direct fluid flow into and out of various ports of the assembly. The housing 18 (as well as various internal components thereof) is a Div. 1/Zone 1 rated, IP 56 enclosure. As will be explained in greater detail below, the assembly overcomes existing problems in the art by providing a highly reliable, high flow, low actuation force flow control device that is pressure insensitive and vibration and contaminant resistant. The actuator 18, disclosed herein, may be employed in the context of trip valves, relief valves, reducing valves, as well as in the context of the control of hydraulic fluid, e.g. on/off control, flow modulation, directional control, pressure control, etc.

Figure 2:
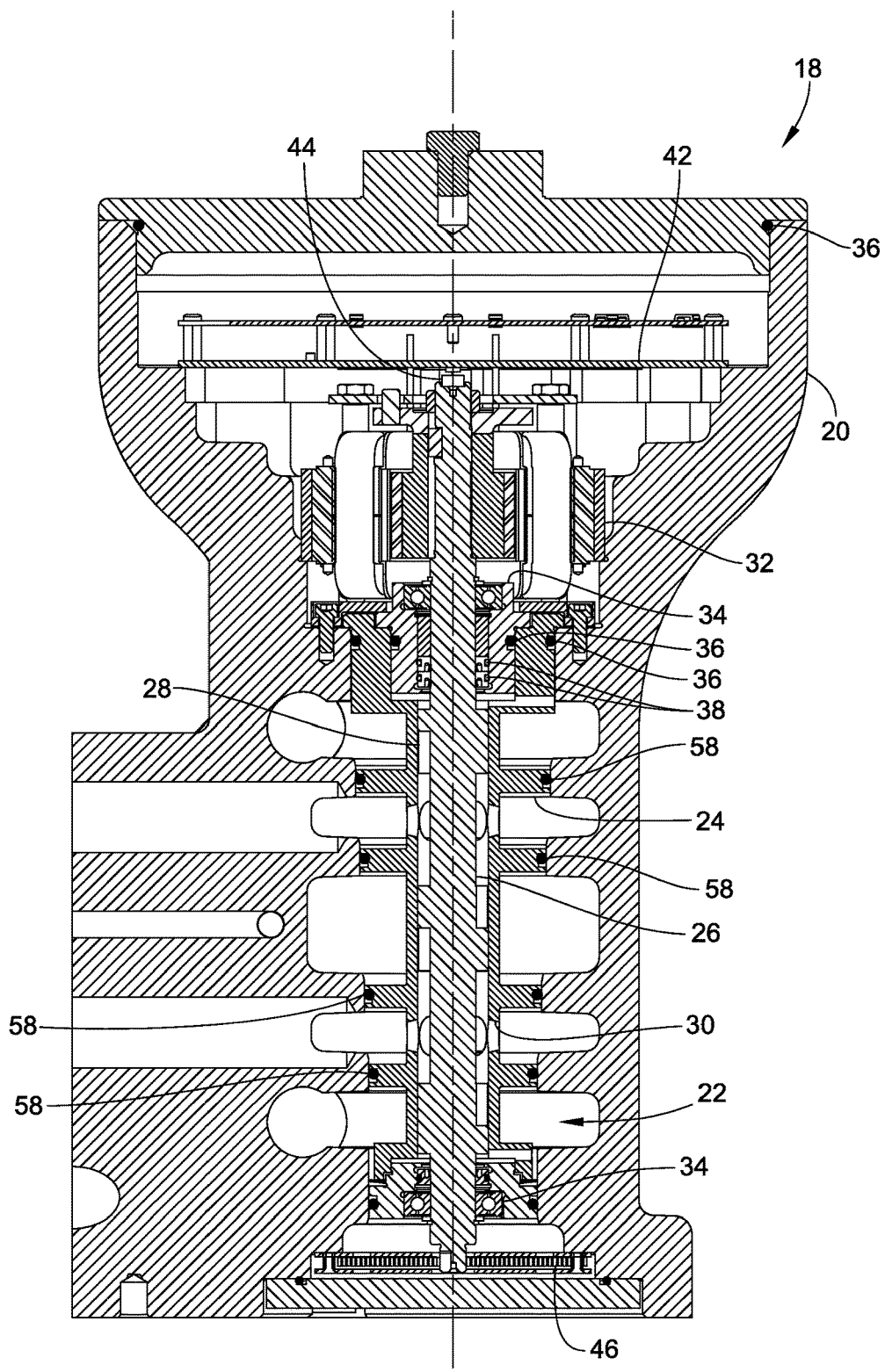
FIG. 2 is a cross-sectional view of the electro-hydraulic actuator assembly of FIG. 1.

Turning now to FIG. 2, embodiments of the invention include a rotary control valve 22 made up of an outer sleeve element 24 and an inner spool element 26, with matching ports 28 and slots 30, respectively. Note that slots 30 function as flow ports, and are thus referred to herein as ports 30. The ports 28, 30 are arranged essentially radially and equally-spaced, such that pressure loading on the spool 26 is balanced so as to not side-load the spool 26 one way or the other. The rotary control valve 22 may be actuated by rotary electric actuating element 32, which in the embodiment of FIG. 2 is a direct coupled Limited Angle Torque (LAT) motor coupled to spool 26. Each slot shaped port 30 of spool 26 is formed on a valve member thereof and includes a bottom edge and opposed side edges depending from the bottom edge.

The rotary electric actuating element 32 has a high reliability as it is separated from the fluid and kept dry through the use of isolation seals 36, 38. This keeps the rotary electric actuating element 32 free of contamination that can build up and inhibit motion. Also, in particular embodiments, the rotary electric actuating element 32 uses large-diameter wire for the coil windings. This large-diameter wire is resistant to the strain and small movements that can cause failure in small torque motor windings. In alternate embodiments, the rotary control valve may be actuated by a geared brushless DC motor, a solenoid, or other rotary electric actuating element with an integrated driver circuit. In a particular embodiment, the inner spool element 26 is mated essentially concentrically to the outer sleeve element 24 by anti-friction elements 34. In a more particular embodiment, the anti-friction elements 34 are deep groove ball bearings.

Figure 3:
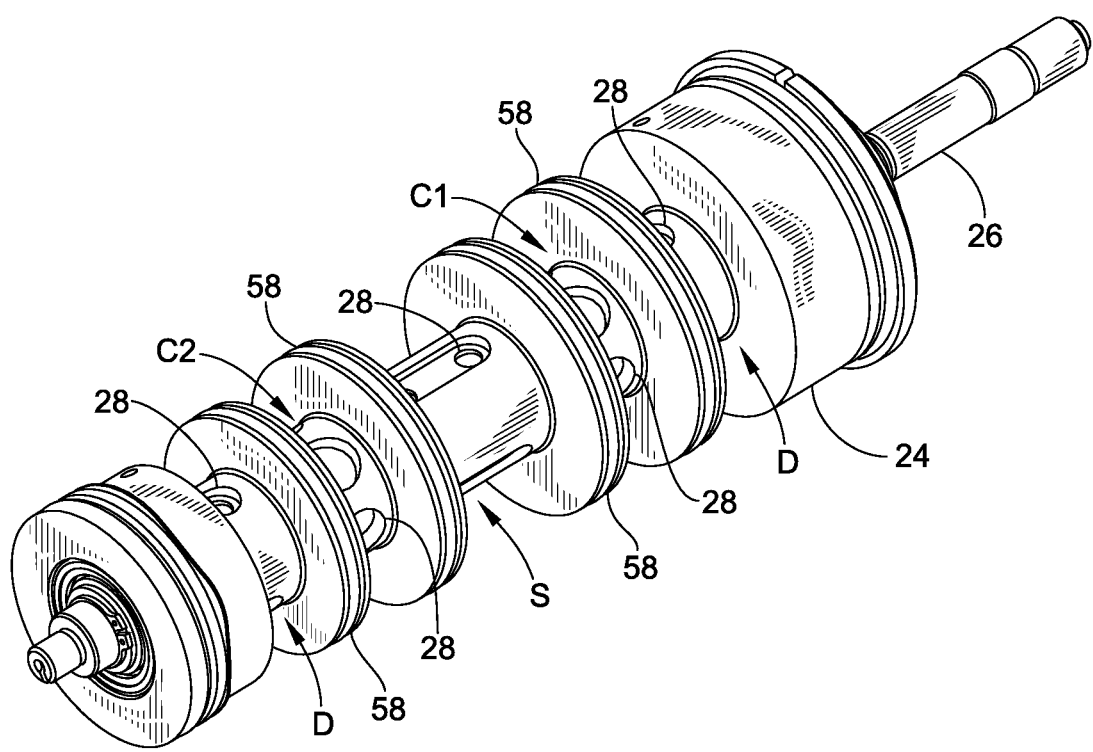
FIG. 3 is a perspective view of a portion of a rotary control valve, constructed in accordance with an embodiment of the invention.

FIG. 3 is a perspective view of a portion of the rotary control valve 22 shown in FIG. 2. In embodiments of the rotary control valve 22 having two control ports, they would be arranged 180 degrees apart. In embodiments of the rotary control valve 22 having three control ports, they would be arranged 120 degrees apart, and so on. The rotary control valve could be configured in a three-way or four-way control valve configuration. A four-way valve embodiment is shown in FIG. 3, with a first control flow port ("C1" in FIG. 3), and a second control flow port ("C2" in FIG. 3) both connected to the controlled element, which may be a hydraulic power cylinder.

In either configuration, rotation in either direction from the null position (no flow out of any ports), will direct flow from the supply ("S" in FIG. 3) to C1, and from C2 to the drain ("D" in FIG. 3), or from the supply to C2 and from C1 to the drain. Note that each of ports labeled D, C1, C2, S are isolated from one another through the use of seals 58 arranged on sleeve 24.

Returning now to FIG. 2, the position of the rotary control valve 22 is controlled by the rotary electric actuating element 32, an LAT in the embodiment shown in FIG. 2. The rotary actuating element 32 is controlled by the integrated driver circuit board 42, using an electronic rotary position sensor 44 to monitor valve position. In certain embodiments, a return spring 46 is attached to the inner spool element 26 to provide a fail-safe rotation of the spool 26 in the event of loss of signal to the rotary electric actuating element 32. The return spring 46 will close or move the valve, particularly the spool 26, to the failsafe position upon loss of power and does not depend on hydraulic pressure to ensure that the valve goes to the failsafe position.

The servo-valve in the device, described herein, is designed to operate with fluid having a cleanliness of ISO 4406 20/18 or cleaner. It has a unique rotating valve, as opposed to linear, which is supported by rotary anti-friction bearings 34 concentric with the outer stationary sleeve element 24 resulting in low actuation forces. Clearances between the moving and stationary valve elements 24, 26 are larger than the contamination particles, preventing contamination from jamming the valve. In an exemplary embodiment, the radial clearance gap, i.e. the difference between the radius of the outer periphery of the spool and the radius of the bore extending through sleeve 24, is between about 0.0005" and about 0.005". However, those skilled in the art will recognize that the other radial clearances are conceivable depending upon application, particularly expected contaminant particle size.

Pressure loading on the rotary control valve 22 is radially balanced, eliminating radial deflections that could cause drag from contact with portions of the outer non-rotating sleeve element 24. Also, pressure loading on the rotary control valve 22 is axially balanced, eliminating friction or drag from bearings 34. Additionally, in particular embodiments, flow force reduction techniques are employed to ensure that flow forces are low, ensuring that high actuator force margins are maintained regardless of system pressure. Because the forces on the rotary control valve 22 are low, a servo-valve capable of high flow rates without multiple amplification stages is achievable using a low-power rotary electric actuation element 32.

In a particular embodiment of the invention, the electrical actuator assembly has integrated electronics for servo-valve and final output actuator position control in the form of a driver circuit 42. Further, the electrical actuator assembly 18 supports dual control setpoint inputs and dual power inputs which allow the unit to be powered from independent supplies and from independent controllers, increasing overall reliability. The electrical actuator assembly 18 has provisions for high speed unit/unit redundant health monitoring links. This allows for the use of redundant servo-valves for very critical applications, wherein the second servo-valve maintains operation if the first servo valve or electronics were to fail. Dual final actuator position feedback loops are utilized to maintain operation even in the event of a feedback sensor fault. In an embodiment of the invention, the electronics in the electro-hydraulic actuator assembly are capable of sustained operation at 85° C., which is higher than that for electronics in conventional proportional valves.

Figure 4:
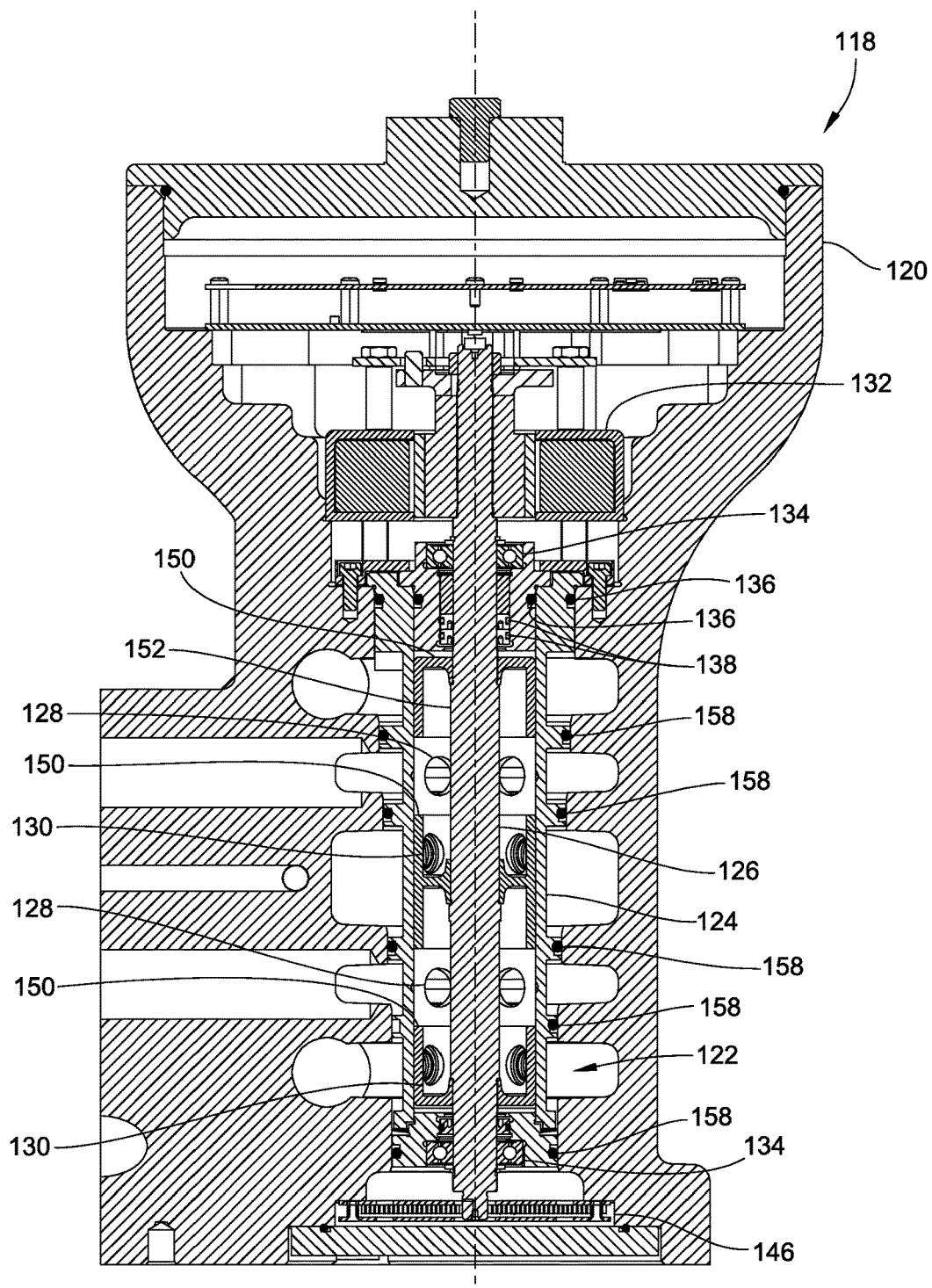
FIG. 4 is a cross-sectional view of another embodiment of an electro-hydraulic actuator assembly, constructed in accordance with teachings of the invention.

Turning now to FIG. 4, another embodiment of a servo-valve assembly with integrated electrical actuator 118 is illustrated. This embodiment is the same as the embodiment described at FIGS. 1-3, with several exceptions as described below. Indeed, the assembly 118 includes a housing 120 which carries a rotary control valve 122 therein. As was the case with the embodiment of FIGS. 1-3, housing 120 may be a Div. 1/Zone 1 IP 56 rated enclosure.

The rotary control valve 122 includes a stationary sleeve 124, with a plurality of ports 128, which surrounds a rotatable valve spool 126, also with a plurality of ports 130. Ports 128, 130 are equally radially spaced so that control valve 122 is balanced. Further, as was the case with the embodiment of FIGS. 1-3, a plurality of seals 158 are arranged along the sleeve 124 to isolate the various ports 128, 130 from one another. The valve spool 126 is held accurately and concentrically within the sleeve 124 through the use of anti-friction elements 134. The spool 126 is coupled to a rotary electric actuating device 132 which is maintained in a dry state through the use of isolation seals 136, 138.

The rotary electric actuating device 132 is a rotary solenoid in this design. Such a device is highly reliable, and provides significant power cost savings given its lower power of actuation. This particular rotary electric actuating device 132 may be a normally closed type rotary solenoid wherein with power applied to the device 132, the rotary control valve 120 is held in a normally closed position. Upon interruption of power, the rotary electric actuating device 132 will rotate valve spool 126 to the desired position. Those skilled in the art will recognize that the solenoid used for electric actuating device 132 could equally be a normally open configuration as well. Additionally, a return spring 146 may also be provided to return valve spool 126 to a failsafe position upon a loss of power.

Figure 5:
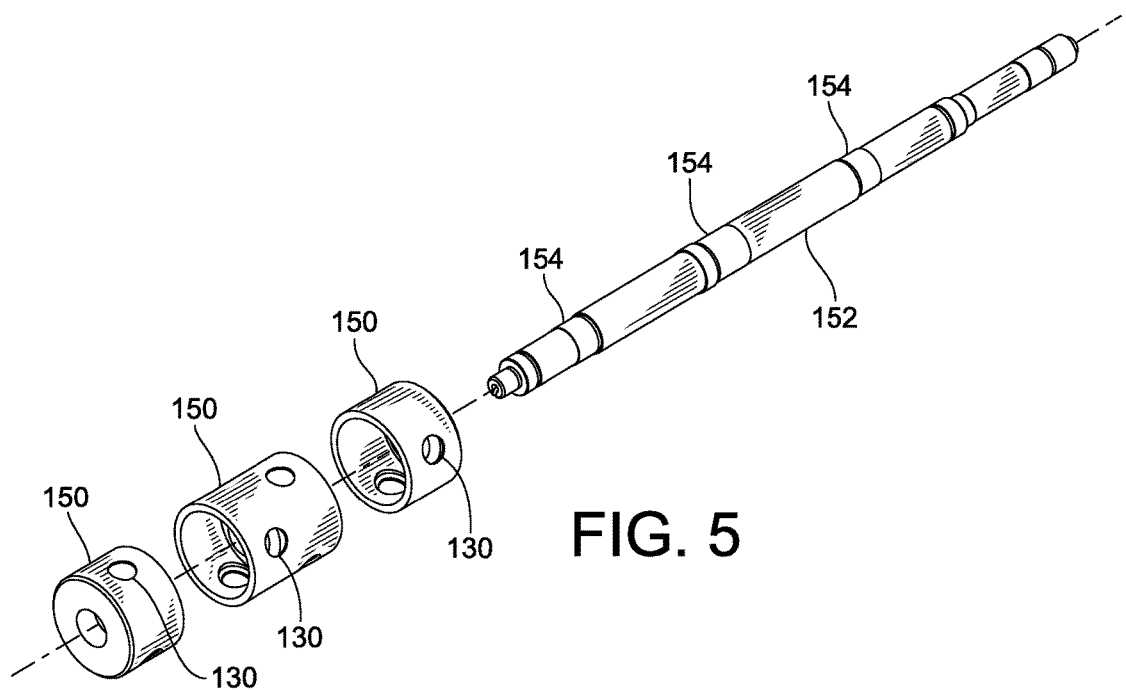
FIG. 5 is a perspective exploded view of a spool of the rotary control valve of the embodiment of FIG. 4.

With reference now to FIG. 5, the spool 126 in this design, unlike the one-piece construction of FIGS. 1-3, is a multi-piece construction. Spool 126 includes multiple cup shaped valve elements 150 which are attached to a spool shaft 152 through welding, or any other mechanical connection means sufficient to ensure the functionality of spool 126. Spool shaft 152 can include pilot diameters 154 for receiving a connecting hub 156 of each cup shaped valve element 150 at its point of connection to spool shaft 152. It will be recognized that this multi-piece assembly for spool 126 is easier and less costly to produce than the one piece structure of FIGS. 1-3 from a machining stand point.

Figure 6:
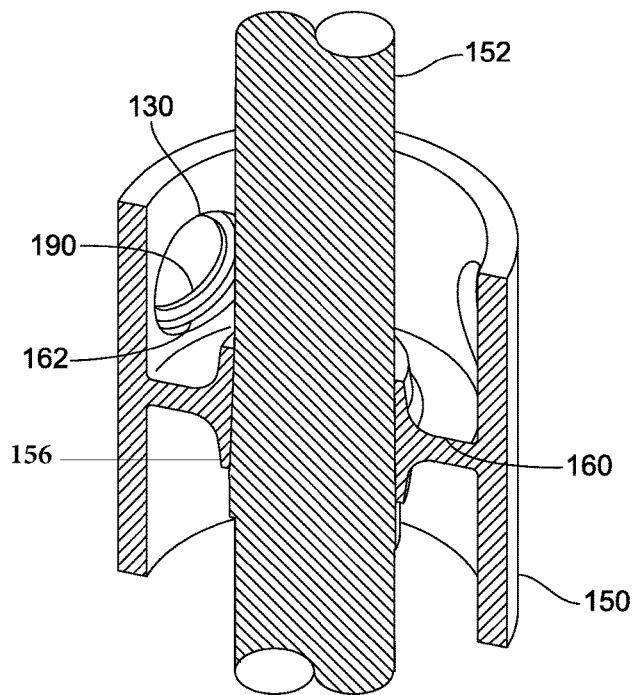
FIG. 6 is a partial perspective cross-sectional view of the spool of FIG. 5.

With reference now to FIG. 6, each cup shaped valve element 150 includes smooth interior surface contours 160 which permit a reduction in flow forces as fluid is directed through each valve element 150. Further, each port 130 of spool 126 is provided with a radially-inwardly-directed contoured spot face representing lead-in area 162 which also provides for a reduction in flow forces. Each contoured spot face is a generally smooth, curved transition, as opposed to a sharp edge that would otherwise define the periphery of the port. Each lead-in area 162 terminates at a thin control edge 190 that has a reduced thickness to reduce flow forces. In certain embodiments, the control edge 190 has a thickness of about 0.015 inches to about 0.060 inches, and preferably about 0.030 inches. It has been found that a control edge thickness of below about 0.015 inches can lead to deflection and erosion, while a control edge thickness of above about 0.060 inches can lead to undesirably large flow forces.

Figure 7:
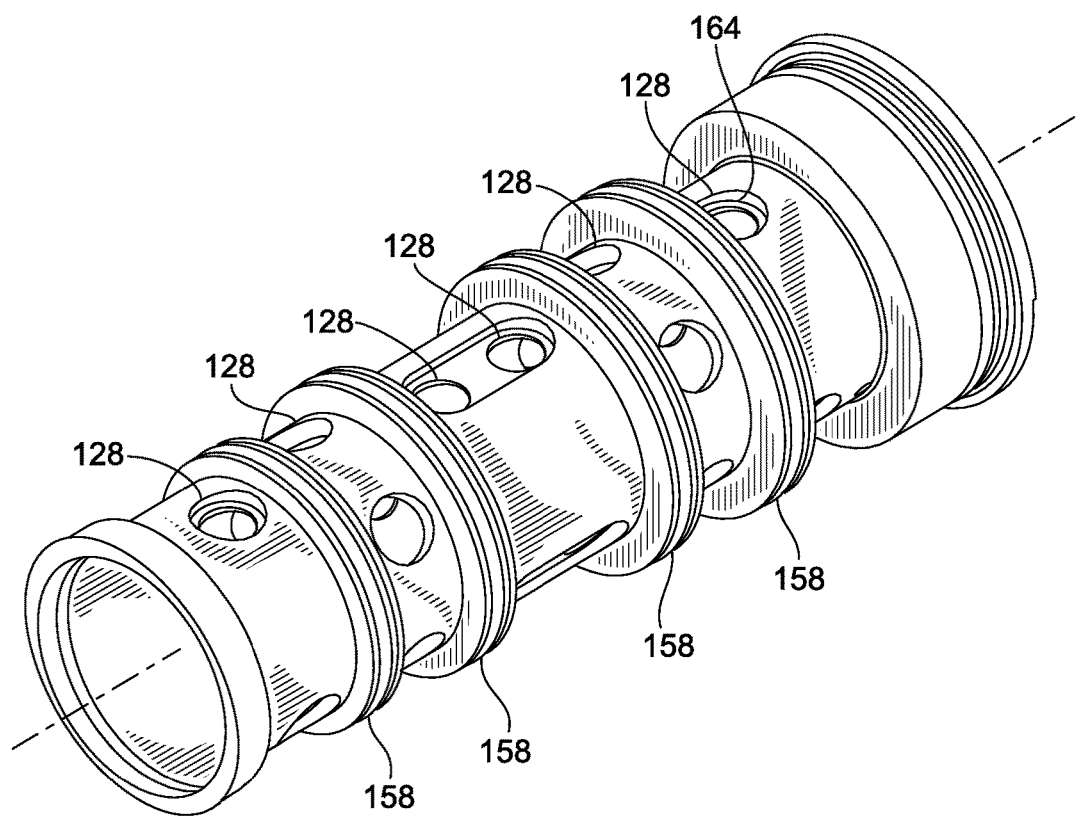
FIG. 7 is a partial perspective view of a sleeve of the rotary control valve of the embodiment of FIG. 4.

Similarly, and with reference now to FIG. 7, each port 130 of sleeve 124 includes a radially-outwardly-directed spot face, lead-in area 164, which also provides for a reduction in flow forces. As was the case with the embodiment of FIGS. 1-3, the rotary control valve 122 may be configured having two control ports wherein they would be arranged 180 degrees apart. In embodiments of the rotary control valve 122 having three control ports, they would be arranged 120 degrees apart, and so on. The rotary control valve 122 could be configured in a three-way or four-way control valve configuration. A four-way valve embodiment is shown in FIGS. 4-7.

Figure 8:
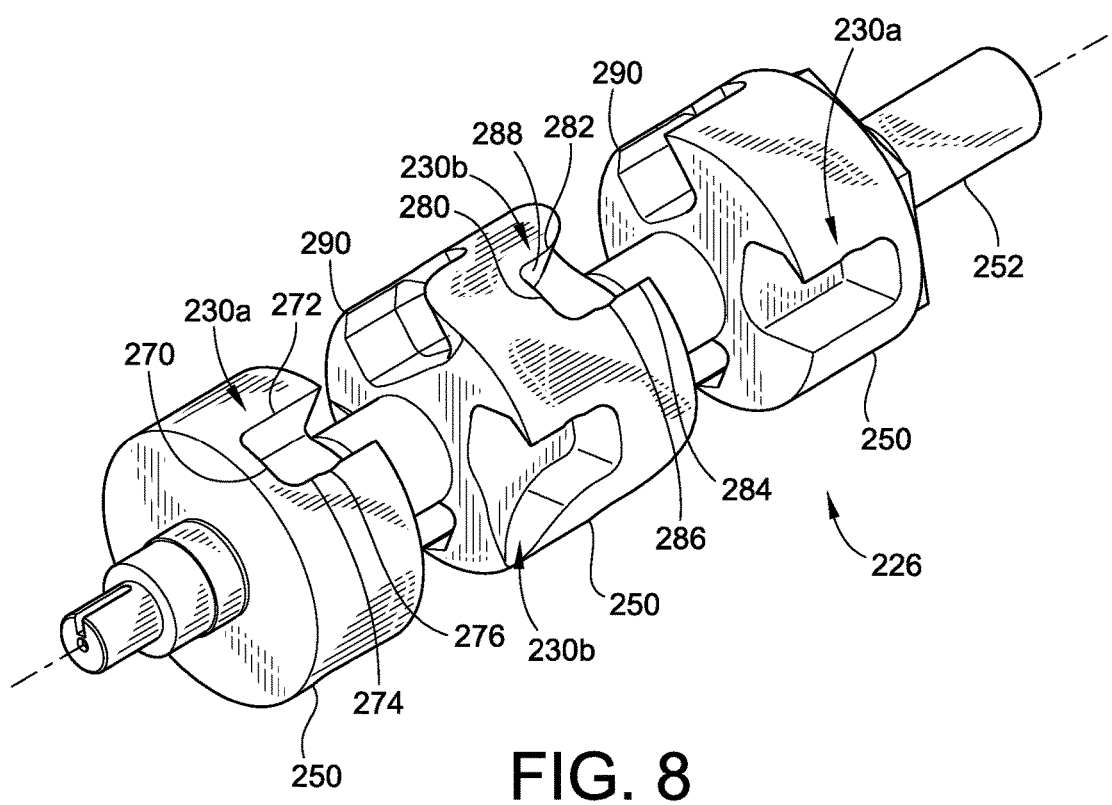
FIG. 8 is a perspective view of another embodiment of a spool constructed in accordance with the teachings of the present invention.

Turning now to FIG. 8, another embodiment of a spool 226 is illustrated. This embodiment of spool 226 is also machined as a one-piece construction from a single blank, similar to spool 26. This embodiment of spool 226 also includes reduced thickness control edges 290 similar to spool 126, as will be described in greater detail below.

Spool 226 includes a plurality of valve members 250 formed on a shaft 252. The outer most valve members 250 include generally slot shaped ports 230a, while the interior central valve member 250 includes generally slot shaped ports 230b. From inspection of FIG. 8, it can be seen that ports 230a and 230b each have an irregular shape, which will be discussed in turn.

Slots 230a include a bottom edge 270, and side edges 272, 274 depending away from bottom edge 270. The side edges 272, 274 are in an opposed spaced relationship, with one side edge 274 including a small indentation 276 formed along its length. As can be seen at the right-most valve member 250 in FIG. 8, each slot 230a, and more particularly side edge 274, is a control edge 290 having a reduced thickness of about 0.015 inches to about 0.060 inches, and preferably about 0.030 inches.

Slots 230b also include a bottom edge 280, and opposed side edges 282, 284 depending away from bottom edge 280. One side edge 284 includes a small indentation 286 formed along its length. Furthermore, side edge 284 represents a control edge 290 having a reduced thickness of about 0.015 inches to about 0.060 inches, and preferably about 0.030 inches. Additionally, side edge 282 is non-parallel with side edge 284, and terminates in a rounded corner 288.

Those skilled in the art will recognize that the rotary electric actuating device 32 of FIGS. 1-3 could equally be employed with the multi-piece spool 126 of FIGS. 4-7, or the spool 226 of FIG. 8. Further, the rotary solenoid embodying rotary electric actuating device 132 of FIGS. 4-7 could equally be employed with the single piece spool 26 construction of FIGS. 1-3, or spool 226 of FIG. 8.

As described herein, the design of the electric actuator lends itself to lower-cost manufacturing due to the fact that the design requires less precision and shorter assembly/test times than conventional servo-valves. The rotary control valve is (mass) rotationally balanced and its position is not adversely affected by vibration. A bi-directional, high-torque rotary electric actuating element can be used to rotate the rotary control valve. High torque combined with the low valve actuation force provides high force margin in both directions for shearing dirt particles (contamination) in the oil. It does not require a return spring for torque (or force when compared linear electric actuators) in the reverse direction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve assembly comprising:
a housing including at least one port; and
a rotary valve disposed within the housing, the rotary valve comprising:
an outer sleeve with at least one port aligned with the at least one port of the housing;
a spool rotationally disposed within the sleeve, the spool including a shaft and at least one valve element disposed along the shaft, the at least one valve element including at least one port formed thereon;
a first and a second anti-friction element supporting opposing ends of the shaft of the spool;
a rotary electric actuating device coupled to an end of the shaft, the rotary electric actuating device operable to rotate the spool to selectively align the at least one port of the spool with the at least one port of the sleeve; and
wherein the sleeve incorporates a radially-outwardly-directed contoured spot face lead-in area adjacent the at least one port of the sleeve, and wherein the at least one valve element includes a radially-inwardly-directed contoured spot face lead-in area adjacent the at least one port thereof, wherein the radially-outwardly directed contoured spot face lead-in area and the radially-inwardly-directed contoured spot face lead-in area face away from one another when the at least one port of the spool and the at least one port of the sleeve are aligned.

2. A valve assembly comprising:
a housing including at least one port; and
a rotary valve disposed within the housing, the rotary valve comprising:
an outer sleeve with at least one port aligned with the at least one port of the housing;
a spool rotationally disposed within the sleeve, the spool including a shaft and at least one valve element disposed along the shaft, the at least one valve element including at least one port formed thereon;
a first and a second anti-friction element supporting opposing ends of the shaft of the spool;
a rotary electric actuating device coupled to an end of the shaft, the rotary electric actuating device operable to rotate the spool to selectively align the at least one port of the spool with the at least one port of the sleeve; and
wherein the sleeve incorporates a radially-outwardly-directed contoured spot face lead-in area adjacent the at least one port of the sleeve, and wherein the at least one valve element includes a radially-inwardly-directed contoured spot face lead-in area adjacent the at least one port thereof, wherein the radially-outwardly directed contoured spot face lead-in area and the radially-inwardly-directed contoured spot face lead-in area face away from one another when the at least one port of the spool and the at least one port of the sleeve are aligned;
wherein the radially-inwardly-directed contoured spot face lead-in area of the at least one port of the at least one valve element terminates in a reduced thickness control edge having a thickness of about 0.015 inches to about 0.060 inches.

3. The valve assembly of claim 2, wherein the thickness of the control edge is about 0.030 inches.

4. The valve assembly of claim 2, wherein the spool is a one-piece construction machined from a single blank.

5. The valve assembly of claim 2, wherein the spool is a multi-piece construction, with the at least one valve element mechanically attached to the shaft.

6. The valve assembly of claim 5, wherein the shaft of the spool includes at least one pilot diameter of the shaft for receipt of a hub of the at least one valve element.

7. The valve of claim 2, wherein the rotary electric actuating device is one of a limited angle torque motor, a geared brushless DC motor, or a solenoid.

8. A valve assembly comprising:
a housing including at least one port; and
a rotary valve disposed within the housing, the rotary valve comprising:
an outer sleeve with at least one port aligned with the at least one port of the housing;
a spool rotationally disposed within the sleeve, the spool including a shaft and at least one valve element disposed along the shaft, the at least one valve element including at least one port formed thereon;
a first and a second anti-friction element supporting opposing ends of the shaft of the spool;
a rotary electric actuating device coupled to an end of the shaft, the rotary electric actuating device operable to rotate the spool to selectively align the at least one port of the spool with the at least one port of the sleeve; and
wherein the sleeve incorporates a radially-outwardly-directed contoured spot face lead-in area adjacent the at least one port of the sleeve, and wherein the at least one valve element includes a radially-inwardly-directed contoured spot face lead-in area adjacent the at least one port thereof, wherein the radially-outwardly directed contoured spot face lead-in area and the radially-inwardly-directed contoured spot face lead-in area face away from one another when the at least one port of the spool and the at least one port of the sleeve are aligned; and a return spring for biasing the spool to a fail-safe position in the event of a failure in the rotary electric actuating device.

9. The valve assembly of claim 8, wherein the return spring is coupled to an end of the shaft of the spool opposite the end of the shaft that is coupled to the rotary electric actuating device.

10. The valve assembly of claim 9, wherein the first and second anti-friction elements are first and second bearings, the first bearing axially disposed along the shaft of the spool interior of the return spring, the second bearing axially disposed along the shaft of the spool interior of the rotary electric actuating device, and wherein the first and second bearings concentrically locate the spool within the sleeve with a radial clearance of between about 0.0005 inches to about 0.005 inches.

11. The valve assembly of claim 2, wherein the rotary electric actuating device is isolated from all hydraulic fluid cavities of the valve assembly by one or more sealing elements.

12. The valve assembly of claim 2, wherein the outer sleeve includes two or more axially-spaced ports, and wherein each axially-spaced port is isolated from other axially-spaced ports by a seal disposed between the outer sleeve and the housing.

13. The valve assembly of claim 2, wherein the rotary valve is a four-way valve.

* * * * *